United States Patent [19]
Lang

[11] Patent Number: 6,161,994
[45] Date of Patent: Dec. 19, 2000

[54] DEVICE FOR CLEANING THE WORKING AREA OF CHIP REMOVAL MACHINES

[76] Inventor: Gunter Lang, Goethestrasse 40/1, 73249 Wernau, Germany

[21] Appl. No.: 09/402,225

[22] PCT Filed: Jan. 20, 1999

[86] PCT No.: PCT/DE99/00112

§ 371 Date: Oct. 1, 1999

§ 102(e) Date: Oct. 1, 1999

[87] PCT Pub. No.: WO99/39866

PCT Pub. Date: Aug. 12, 1999

[30] Foreign Application Priority Data

Feb. 3, 1998 [DE] Germany ............... 298 01 719 U
May 6, 1998 [DE] Germany ............... 198 20 105

[51] Int. Cl.$^7$ .................... B23Q 11/00; B23C 9/00
[52] U.S. Cl. .............. 409/137; 409/136; 483/31; 29/DIG. 50; 29/DIG. 83; 29/DIG. 94; 416/44; 416/93 R; 416/135; 416/146 R; 144/252.1; 15/405
[58] Field of Search ................. 409/137, 136; 483/31; 144/252.1, 252.2; 416/44, 135, 142, 146 R, 93 R; 29/DIG. 82, DIG. 83, DIG. 50, DIG. 94; 15/405

[56] References Cited

U.S. PATENT DOCUMENTS

| | | |
|---|---|---|
| 1,423,511 | 7/1922 | Baker ............................ 144/252.1 |
| 1,577,502 | 3/1926 | Tabor . |
| 1,635,769 | 7/1927 | Royle . |
| 2,416,178 | 2/1947 | Kearns et al. .................. 416/135 |
| 2,613,786 | 10/1952 | Emrick ............................ 408/124 |
| 2,780,966 | 2/1957 | Frost et al. ................. 29/DIG. 82 |
| 3,016,217 | 1/1962 | Polleys et al. ................ 416/142 |
| 3,117,726 | 1/1964 | Schoberg ........................ 15/405 |
| 4,534,803 | 8/1985 | Asano et al. .................. 409/137 |
| 4,776,761 | 10/1988 | Diaz . |
| 6,027,309 | 2/2000 | Rawls et al. .................. 416/142 |

FOREIGN PATENT DOCUMENTS

| | | |
|---|---|---|
| 0 045 512 | 8/1981 | European Pat. Off. . |
| 0 641 972 | 8/1994 | European Pat. Off. . |
| 1 218 244 | 5/1960 | France . |
| 2 424 785 | 5/1978 | France . |
| 33 38 039 | 5/1985 | Germany . |

*Primary Examiner*—A. L. Wellington
*Assistant Examiner*—Erica Ergenbright
*Attorney, Agent, or Firm*—Leydig, Voit & Mayer, Ltd.

[57] ABSTRACT

A propeller with pivoting blades is provided as a cleaning tool (1) for the work area of metal cutting machines, where the angle of adjustment for the pivoting blades is such that an air jet is generated supporting the propeller blades (15) in folding open. The propeller blade (15) is arranged in a tool changer stacker instead of a common tool or on a tool spindle and serves to automatically clean the work area by a blowing process.

17 Claims, 2 Drawing Sheets

DEVICE FOR CLEANING THE WORKING AREA OF CHIP REMOVAL MACHINES

FIELD OF THE INVENTION

The invention relates to a device for cleaning the work area of metal cutting machines, particularly removing chips, cooling lubricants and other debris.

BACKGROUND OF THE INVENTION

Although attention is being paid to the removal of chips and coolants or lubricants from machine tools that perform metal cutting operations, most of the time it is unavoidable that chips or other debris settle on the workpiece, its surroundings and on the machine components. Upon completion of the machining process the machine components in the work area, work tables, clamping devices mounted on the tables and the workpieces are covered with chips, cooling lubricants and other debris. Therefore, the work area is typically cleaned manually either following each workpiece or from time to time after several workpieces have been machined. The protective doors of the booth are opened, and the work area is hosed down. However, most of the time this is only feasible if the machine tool is not in operation which reduces the available operating time.

The required labor results in additional personnel expenses, and the loss in operating time increases the machine costs per each machined workpiece.

OBJECT AND SUMMARY OF THE INVENTION

In view of the foregoing, an object of the invention is to provide a device which addresses the problems associated with cleaning the work area of a metal cutting machine. The present invention provides these and other advantages and overcomes the drawbacks of the prior art by providing a device for cleaning a work area of a tool machine which substantially eliminates the need for manual cleaning of chips and other residues and debris from the work area. The solution is particularly suitable for machine tools equipped with a tool changing device or with several work spindles. The device of the invention is arranged either in the tool stacker or on one of the tool spindles and serves to clean the work area by a blowing process when required. The device is equipped with a means of connection by means of which it is arranged on a work spindle and can be grasped by a clamping chuck, for example. If required, the device may also be equipped with means that interact with a tool changer. This may be a ring flange, a disk flange, or similar device.

If the device of the invention is integrated into a tool changing system the machining program may be structured such that the device is the last tool included in the machining cycle. Consequently, the cleaning process is included in the programmable automatic machining cycle, and the operators will find a clean work area upon completion of the machining cycle.

In order to optimize the cleaning effect it is advantageous to initially position the device at an optimal distance over the elements to be cleaned by means of the machine's existing programmable axial positioning movements after the rotating motion has begun and to move it laterally, if required.

The device of the invention is a cleaning tool that relieves the operating personnel insofar as no manual or substantially no manual removal of the chips is required. In addition, the cleaning process takes less time than before which saves machine time. Furthermore, the cleaning effect is uniform and easily reproduced as a result of the programmable cleaning path and the programmable rotating speed of the device. Therefore, scrap arising from an insufficiently clean work area is prevented.

The cleaning tool (the device) has pivotally mounted propeller blades which, in the off position, are folded into a position in which the device requires minimal space. When the cleaning tool rotates the propeller unfolds in that the propeller blades pivot into a substantially radial position. For this purpose, the propeller blades are mounted on a base by means of hinge elements. The hinge elements define pivot axes which, for example, are oriented transversely to the base's axis of revolution. The propeller blades, which are oriented approximately axial in the off position, open up as a result of the centrifugal force as soon as the tool spindle with the cleaning tool begins to rotate.

Advantageously, the propeller blades are connected with a spring element which is constantly prestressed toward the off position in which the propeller blades are substantially axially oriented. The strength of the spring elements is designed such that the propeller blades are maintained in an axial position or substantially in an axial position even if the position of the axis of revolution diverges from the horizontal line. For example, the device may be oriented horizontally without the propeller blades pivoting or folding out of their off position. In applications where it is ensured that the axis of revolution is always vertical, the spring elements may be omitted so that the propeller blades hang downwardly in the off position merely as a result of gravity.

The minimal space required by the device, which is achieved in that the propeller blades are folded inwardly in the off position, permits the device to be arranged on a work spindle in the work area of the machine tool even while other machining processes are performed. When arranged in a stacker as a spare, the device takes up a relatively small space and insofar it is comparable with other tools, such as drills or milling cutters. The cleaning tool can also be used, for example, for blowing dust off of other machines.

If required, the cleaning tool of the invention can be produced from several plastic components. The propeller blades are pivotally mounted on pegs, for example, and the spring elements may be tension springs (helical springs). However, it is also possible to use rubber bands for the spring elements or other expandable materials, such as in the form of O-rings.

It was found to be advantageous for the propeller blades, which are pointing away from the mounting side of the base in the off position, to work as pressure-propellers, i.e. they generate an air jet which is directed away from the base body. The reaction force arising on the individual propeller blades assists the centrifugal force in opening the propeller. This initiates the opening process relatively quickly, even at a lower rotational speed and ensures that all propeller blades open up completely at the same time, thereby preventing unbalance. This applies to embodiments with 2, 3, 4, and up to 8 propeller blades.

Departing from the above specified embodiment, an integral hinge may also be used for pivotally mounting each propeller blade, where the hinge is formed by a strip-like, deformable section of plastic material. In addition, leaf springs or similar devices may be used.

In a simplified embodiment the spring elements may be omitted, if desired. For example, the pivot axes of the hinges may be set transversely to the base's axis of revolution. This permits the propeller to open by abruptly accelerating the tool spindle, and the propeller blades then remain open as a result of the reaction force arising from the movement of the air and the centrifugal force. If the work spindle is abruptly stopped the force of the propeller blades causes the propeller to fold as the blades return to the axial position. If required, a frictional damper or a locking element may be provided on the hinge or separately, which then maintains the propeller blades in this preferred position (off position). These and other features and advantages of the invention will be more readily apparent upon reading the following description of preferred exemplary embodiments of the invention and upon reference to the drawings wherein:

BRIEF DESCRIPTION OF THE DRAWINGS

FIG. 1 is a side elevation view illustrative of the cleaning device of the invention in the off position with the propeller blades folded in;

While the invention will be described and disclosed in connection with certain preferred embodiments and procedures, it is not intended to limit the invention to those embodiments. Rather it is intended to cover all such alternative embodiments and modifications as fall within the spirit and scope of the invention.

DETAILED DESCRIPTION OF PREFERRED EMBODIMENTS

Figure 1:
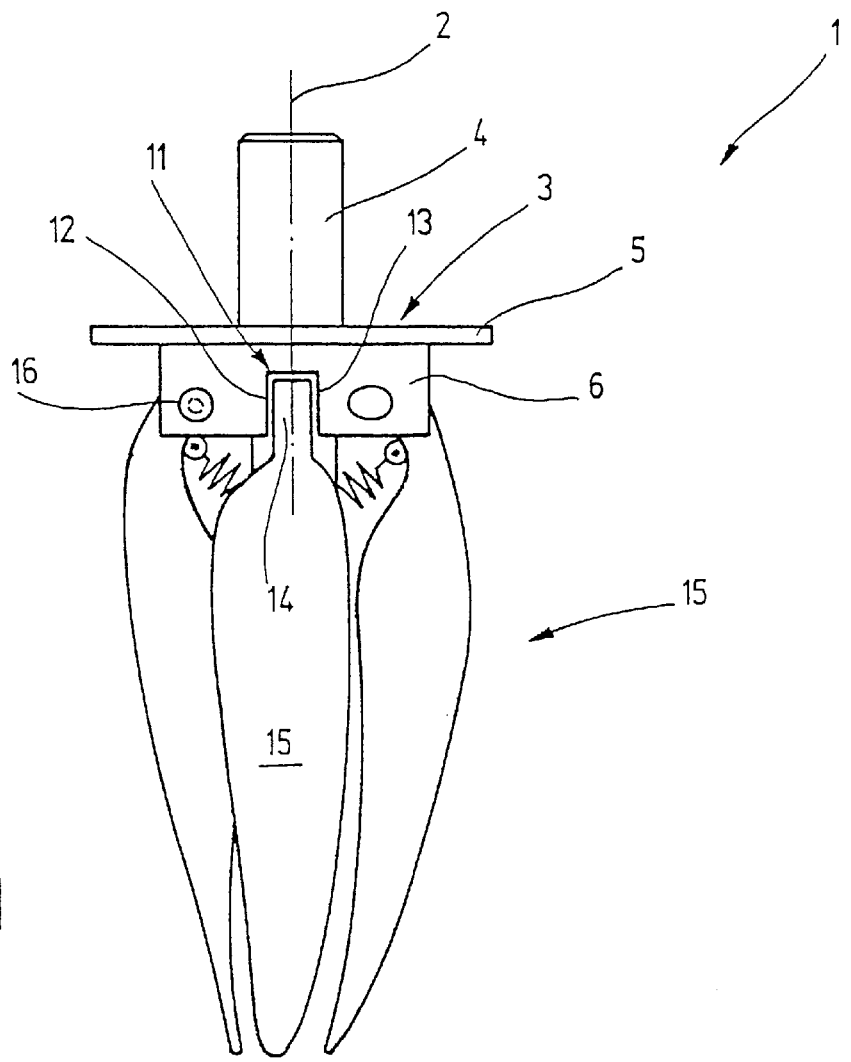
Figure 2:
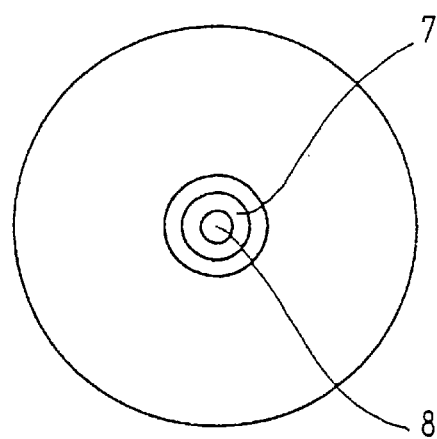
FIG. 2 is a top plan view of the illustrative cleaning device of FIG. 1.

FIG. 1 shows a cleaning tool 1 mountable on a work spindle, which is not shown and which rotates about an axis of revolution 2. The cleaning tool 1 has a base 3 which is equipped with a cone shaft or a parallel shaft 4 for the purpose of connection with the tool spindle or machine spindle. The shaft is joined by a disk-shaped section 5 which may be provided for installation in a tool changer, for example. On the side opposite the parallel shaft 4, the base 3, which is produced in one piece of plastic or metal, is provided with receptacles 6 projecting axially out from the disk-shaped section 5. If the base 3 is made of plastic, a metal insert 7 may be arranged in the parallel shaft 4 for reinforcement, as shown in FIG. 2, the metal insert 7 having a central bore hole 8. The latter may serve to supply compressed air or liquid media, for example to perform an additional concentrated cleaning process.

The receptacles 6 define spaces between them or recesses 11 with opposing planar sides 12, 13 that are spaced apart and arranged parallel to each other. The recesses 11 serve to receive the respective ends 14 of the propeller blades 15. Each end 14 has one bore hole which is penetrated by a pin. The pin extends between two receptacles 6 through the recess 11. In FIG. 1, the head 16 of such a pin is visible on the left. The pin and the end 14 of the propeller blade 15 are dimensioned such that the propeller blade 15 sits on the pin with minimal play and therefore pivots easily. In addition, between the end 14 and the two planar faces 12, 13 there is relatively minimal play so that the propeller blade 15 is guided in the recess 11.

Figure 3:
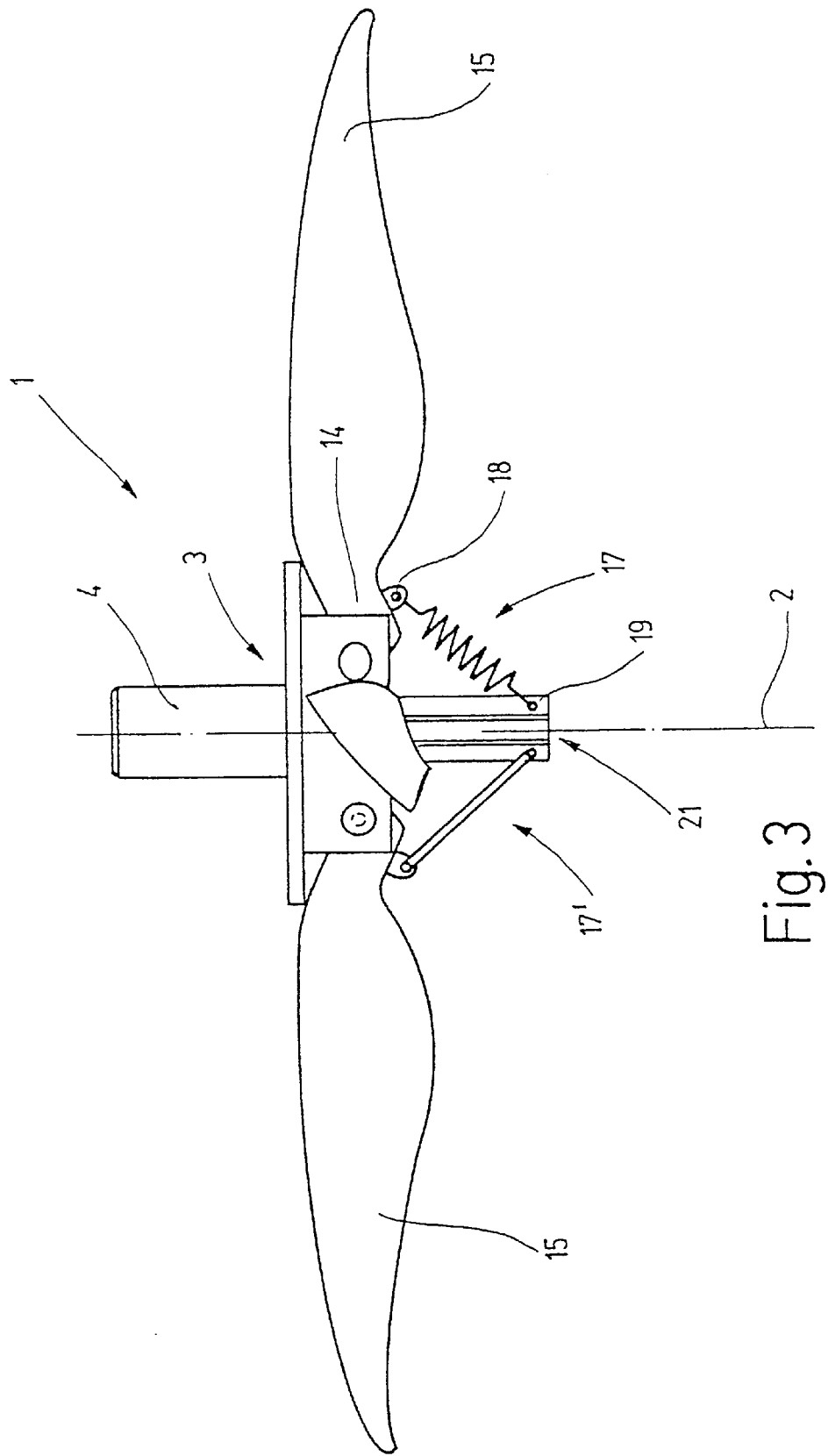
FIG. 3 is a side view of the cleaning device of FIG. 1 in the operating position.

The cleaning tool shown in FIG. 1 has a total of four propeller blades 15 pivotally mounted by means of pins about pivot axes extending transversely to the axis of revolution 2. The pivot axes form an angle of 90°. They are arranged such that accelerating and delaying the rotating motion about the axis of revolution 2 has no effect on the pivoting motion of the propeller blades 15. However, the propeller blades 15 may be pivoted, as a result of the centrifugal force and aerodynamic forces, from their axial position, which is the off position, shown in FIG. 1, into a radial position, representing the operating position, shown in FIG. 3. In order to maintain the propeller blades 15 in the off position when they are not required, spring elements 17, 17' are provided between the body or base 3 and each propeller blade 15, as is evident particularly in FIG. 3. A spring element can be a tension spring 17, for example, whose one end is hooked into an eyelet 18, which is formed in one piece on the propeller blade 15 near the end 14 of the propeller blade 15. The other end of the tension spring 17 engages in a cross hole 19 arranged on a central axial extension 21 of the base 3. Instead of the tension spring 17 a rubber band or an O-ring 17' may serve as a retracting device as shown on the left side in FIG. 3.

The central axial extension 21 may be designed as a nozzle for a cleaning agent. For this purpose it is provided with the through-bore hole 8 visible in FIG. 2. If required, the mouth of the through-bore hole 8 may have a nozzle contour (venturi nozzle, fan nozzle or another nozzle shape to increase the cleaning effect with a small quantity of fluid) in the area of the axial extension 21. The cleaning tool 1 as described works as follows:

During the machine tool's normal operation the cleaning tool 12 does not rotate about the axis of revolution 2. The retrieving device formed by the springs 17 therefore maintains the propeller blades 15 in the position shown in FIG. 1 regardless of the installed position of the work spindle on the machine tool, i.e. both when mounted hanging or horizontally.

When the work area of the machine tool has to be cleaned the cleaning tool 1 is accelerated about the axis of revolution 2. The centrifugal force acting on the propeller blades 15 now causes the propeller to unfold in that the propeller blades 15 pivot outward about their pivot axes. The device is designed for clockwise rotation, and the profile of the propeller blades 15 is designed such that they, when an accelerating rotating motion is initiated, move about the axis of revolution 2 initially from the off position (FIG. 1) in the direction of the operating position (FIG. 3) as a result of the centrifugal force. Owing to the continuously increasing speed and the effect of the air resistance, i.e. the reaction force of the generated air jet on the propeller blades 15, the propeller blades 15 finally move into the final position of the operating position as per FIG. 3. In this position, they abut on section 5 of the base 3. Therefore, section 5 forms a buffer ring absorbing the considerable reaction forces acting on the propeller blades 15. The force of pressure from the air jet (reaction force) presses the propeller blades 15 against the buffer ring such that the rotating propeller is virtually rigid. Consequently, it can also pivot without risking that centrifugal forces could cause individual propeller blades to move out of their radial position. A pivoting motion by the propeller may serve to enlarge the area of cleaning.

When the operating position has been reached, an air jet is generated, particularly in an axial direction away from the working spindle on the machine tool. The air jet blows away the chips and other debris in the work area. The cleaning effect is adjustable by the number of revolutions of the cleaning tool. In addition, the sector to be cleaned can be enlarged by a specific lateral adjustment of the working spindle.

In order to terminate the cleaning process the rotating motion of the cleaning tool 1 is stopped. This eliminates both the centrifugal force spreading the propeller blades 15 and the air jet's reaction force acting on the propeller blades 15. The retracting device now folds the propeller blades into their off position as per FIG. 1. The springs of the retracting device are dimensioned such that with increasing speed and starting at a specific not excessively high number of revolutions, the spring power is safely overcome by the centrifugal force. However, the spring power is strong enough for the propeller blades 15 to be pivoted back into the off position when the cleaning tool 1 is not rotating. It is also strong enough for the off position to be maintained even when the device is positioned horizontally, such as in a tool changer stacker.

Alternatively, the retracting device 17 may be omitted if the propeller blades are pivotally arranged about pivot axes which are adjusted transverse with relation to the axis of revolution 2. For example, the pivot axis may be positioned at an incline substantially corresponding with the incline of the propeller blade 15. When the cleaning tool 1 accelerates about the axis of revolution 2 the propeller blades 15 unfold, and fold in when the speed is reduced. Locking means, which are not too strong, acting between the base 3 and the propeller blades 15 may be provided for fixating the off position. In addition, a friction-lock may be provided by means of intermediate O-rings, for example.

What is claimed is:

1. Device (1) for cleaning a work area of a metal cutting machine, the metal cutting machine having a tool spindle which is rotatable about an axis of revolution (2), the cleaning device (1) comprising:

a base (3) with at least one connecting means (4) that permits mounting the base (3) on the tool spindle, at least two propeller blades (15), each blade pivotally mounted by a hinge element for pivotal movement between an off position and an operating position about a pivot axis which is different from the axis of revolution (2).

2. The cleaning apparatus according to claim 1 wherein each hinge element comprises a deformable section of material.

3. The cleaning apparatus according to claim 1 wherein each hinge element is a spring hinge or an integral hinge.

4. The cleaning apparatus according to claim 1 wherein the pivot axes of the hinge elements are oriented perpendicularly to the axis of revolution of the spindle.

5. The cleaning apparatus according to claim 1 wherein the pivoting movement of the propeller blades about the hinge elements is inhibited by a retaining device.

6. The cleaning apparatus according to claim 5 wherein the retaining device comprises a friction lock or a stop.

7. The cleaning apparatus according to claim 1 wherein the base has at least one bore hole through which air or cooling lubricant can be supplied.

8. An apparatus for cleaning a work area of a tool machine, the tool machine having a tool spindle which is rotatable about an axis of revolution, the cleaning apparatus comprising:

a base portion having at least one connecting element for mounting the base portion on the tool spindle, and a plurality of propeller blades, each propeller blade being pivotally connected to the base portion by a respective hinge element for pivotal movement between an off position and an operating position about a pivot axis which is different from the axis of revolution of the spindle.

9. The cleaning apparatus according to claim 8 wherein the pivot axes of the respective propeller blades are oriented transversely with respect to the axis of revolution of the spindle.

10. The cleaning apparatus according to claim 8 wherein each of the propeller blades are connected to the base portion with a respective spring element which pre-stresses the respective propeller blade toward the off position of the respective propeller blade.

11. The cleaning apparatus according to claim 10 wherein each spring element comprises a tension spring.

12. The cleaning apparatus according to claim 10 wherein each spring element comprises a band of tension-elastic material.

13. The cleaning apparatus according to claim 8 wherein a longitudinal axis of each of the propeller blades extends substantially parallel to the axis of revolution of the spindle in the off position of the respective propeller blade.

14. The cleaning apparatus according to claim 8 wherein each hinge element includes a pin which extends through a bore hole in the respective propeller blade.

15. The cleaning apparatus according to claim 8 wherein the propeller blades are moved from the off position to the operating position by centrifugal force produced by rotation of the base portion by the tool spindle.

16. The cleaning apparatus according to claim 8 wherein the propeller blades each have an air stream-generating profile such that upon rotation of the base portion by the tool spindle, the profiles of the propeller blades produce an air stream which has a reaction force on the propeller blades that assists the propeller blades to pivot from the off position into the operating position.

17. The cleaning apparatus according to claim 8 wherein the propeller blades each have an air stream-generating profile such that upon rotation of the base portion by the tool spindle the profiles of the propellers produce an air stream which is directed away from the tool spindle.

* * * * *